United States Patent

Kratzenberg et al.

[11] Patent Number: 5,826,892
[45] Date of Patent: Oct. 27, 1998

[54] PUSH LUGGAGE CART

[75] Inventors: Wolfgang Kratzenberg, Schauenburg; Siegfried Stein, Vellmar, both of Germany

[73] Assignee: Expresso Deutschland Transportgerate GmbH, Kassel, Germany

[21] Appl. No.: 645,947

[22] Filed: May 14, 1996

[30] Foreign Application Priority Data

Feb. 20, 1996 [DE] Germany ................. 296 02 974 U

[51] Int. Cl.[6] ........................................ B62D 39/00
[52] U.S. Cl. ............................ 280/33.997; 280/47.35
[58] Field of Search ..................... 280/33.991, 47.35, 280/DIG. 4, 33.997

[56] References Cited

U.S. PATENT DOCUMENTS

| | | |
|---|---|---|
| 3,112,934 | 12/1963 | Buczak ................. 280/33.991 |
| 3,606,432 | 9/1971 | Honatzis ................. 293/120 |
| 4,097,056 | 6/1978 | Castellano ................. 280/33.991 |
| 5,149,114 | 9/1992 | Lewandowski ................. 280/33.992 |

FOREIGN PATENT DOCUMENTS 1401331  4/1965  France .............. 280/33.997

*Primary Examiner*—Brian L. Johnson
*Assistant Examiner*—Jonathan E. Butts
*Attorney, Agent, or Firm*—Anderson, Kill & Olick, P.C.

[57] ABSTRACT

A push luggage cart including a rigid load-bearing frame defining a longitudinal luggage-carrying surface inclined in a direction opposite to a forward movement direction of the cart, a front steering roller and two rear support rollers, two upright bars for supporting a push handle, and a front connection part and two rear connection parts, all having connection members for supporting the frame on the front and rear rollers, with the frame including hollow profile connection sections form-lockingly engaging the connection members of the front and rear connection parts.

5 Claims, 5 Drawing Sheets

PUSH LUGGAGE CART

BACKGROUND OF THE INVENTION

The present invention relates to a push luggage cart and, in particular, to a push luggage cart which forms, together with other identical carts, a group of push luggage carts available at airports, railway stations and similar terminals of mass transportation for use by the public.

Generally a push luggage cart of this type includes a rigid load-bearing frame defining a longitudinal luggage-carrying surface inclined in a direction opposite to a forward movement direction of the cart, a front steering roller rotatable about a vertical axis and two rear support rollers rotatable about rigid axles for supporting the frame on the ground, two upright bars for supporting a push handle extending substantially along an entire width of the push luggage cart, and braking element releasably connected with the handle and acting on the rear support rollers. The push luggage carts of a general type described above may have different forms and are available in a large number at the mass transportation terminals for use by public for carrying heavy luggage from means of mass transportation to individual transport means, e.g., vehicles, and vice versa.

The known forms of such push luggage carts generally have a U-shaped chassis frame, which is arranged in a horizontal plane extending at the height of roller axles and which opens at the rear opposite to the direction of the cart movement. The handle-supporting upright bars are supported on the chassis frame which also supports the front steering roller and the rear support rollers. The load or luggage-carrying surface in this case is formed of support bars mounted on the shaped chassis frame. One embodiment of the push luggage cart is characterized that the support bars are arranged in the plane of the chassis frame. In another embodiment of the push luggage cart, the support bars, which form the luggage-carrying surface, are mounted on the chassis frame and are inclined toward the rear. In both cases, however, the support bars should be welded to the bar-supporting frame. In yet another embodiment of the push luggage cart, the luggage-carrying surface is defined by an arrangement having its own frame with the support bars being supported thereon, with the arrangement itself being mounted on the chassis frame. In this case, the support bars are welded to the arrangement frame which, in turn, is welded to the chassis frame. A common feature of all of those embodiments consists in that each is formed of a large number of separate parts attached to each other by welding. Both the steering roller and the rear support rollers are likewise supported by elements which are welded to the chassis frame.

Accordingly, an object of the present invention is a push luggage cart of the above-described type different embodiments of which can be formed of a small number of easily assembled and exchangeable separate parts, without reduction in its operational and stability characteristics.

Another object of the invention is a push luggage cart of the above-described type, in which the connections of different parts of the cart are so formed that an optimal shape of the cart, in particular with regard to a better visibility of its operation, is optimal.

Yet another object of the invention is a push luggage cart of the above-described type having a reduced weight.

SUMMARY OF THE INVENTION

These and other objects of the invention, which will become apparent hereinafter, are achieved by providing a push luggage cart including a front connection part and two rear connection parts which support the frame on the front and rear rollers and which are provided with connection members cooperating with hollow profile connection sections which form the frame and form-lockingly engage the connection members.

The use of the connections parts, which all have a tri-dimensional shape, permit, independent of their construction, to reduce the number of separate parts for forming a push luggage cart and, thereby, a to reduce a number of junction points. Moreover, the use of the tri-dimensional connection parts permits to form the bars and the stirrups of the cart chassis from hollow profile materials, and to form the connection members as peg-shaped projections cooperating with the hollow profile sections, which insures the connection of the hollow profile sections with the peg-shaped connection members without use of special tools or devices, with the connections being insured by using bracing, screw elements, or, with the use of appropriate material, shrinkage. At that, the bracing of separate elements from opposite sides can be effected with screw-tightened clamps. The use, preferably, of a three-dimensional connection parts, which are formed by injection-molding, permits to use, for manufacturing of the frame and/or other constructional elements, hollow profiles having simple but different cross-sections because the cooperating members, provided on the connection parts, likewise can be formed with simple cross-sections. It is of no importance whether the frame or the elements of the chassis are made from hollow profiles having the same or different cross-sections. The used hollow profiles can be formed of a light material, such as aluminum. The use of light materials not only reduces the weight of the cart but makes the cart user-friendly. The use of aluminum hollow profile also permits to eliminate welding joints which facilitate exchange of the chassis elements if necessary. This is especially advantageous when, e.g., the length of the chassis or its load-carrying surface need be increased. This can be effected by using bars of a necessary length for forming the load-carrying frame. Also, the use of the three-dimensional connections parts improves the visibility of the operation of different elements of the cart which is advantageous when assembly or disassembly of the cart takes place.

In a preferred embodiment of a push luggage cart according to the present invention, the cart chassis has a front suspension for supporting the front steering roller, a load-carrying frame, a rear luggage stirrup, connection elements for the rear rollers. Generally, the chassis is formed of three connection parts and five hollow profile sections. The frame is formed of two L-shaped hollow profile sections which are connected at their front ends with the front connection part and at their rear ends with the rear connection parts. The front and rear end of the two sections form form-locking connections with respective connection parts.

The hollow profile, of which the bars and stirrups are formed, generally has a circular cross-sectional circumference with a square hollow. The peg-shaped connecting members, which are provided on the connection parts have also a square cross-section corresponding to the cross-section of the hollow of the hollow profile. The connection parts are further provided, in the regions of their respective end surfaces with base elements having circular openings the cross-section of which corresponds to the cross-section of the hollow profile circumference. The hollow profile sections, of which the bars and stirrups are made, are further provided, according to the invention, with two opposite longitudinal grooves for receiving strips of a rubber or plastic material.

In a further preferred embodiment of a push luggage cart according to the present invention, the front connection part has a T-shaped profile in the plan view, with a central stand being provided on the T-shaped cross-girder. The upper surface of the cross-girder is provided with openings at opposite free outer ends thereof for receiving respective ends of the longitudinal bars, which form the frame, with auxiliary rollers, which insure tilt-resistance of the cart, being attached at the bottom surface.

In the push luggage carts of this type, the frame limits a luggage-carrying surface formed of load-supporting bars. According to the invention, there are provided, in the middle stand, sleeve-like elements for receiving the end portions of the load-supporting bars forming the luggage-carrying surface. Naturally, further sleeve-like elements can be provided on the central stand for receiving end portions of the load-supporting bars which form a stirrup limiting the luggage-carrying surface.

The rear luggage supporting stirrup is formed of a one-piece U-shaped hollow profile section, which opens downward, with the free ends of the two legs thereof being supported on the two rear connection parts in a spaced relationship relative to support point of respective upright handle-carrying bars. The stirrup legs are supported against the upright bars with support members which engage in respective longitudinal grooves of respective legs and upright bars, forming form-locking connections therewith.

A stirrup, which limits the luggage-carrying surface from the front, has likewise a U-shaped profile, with the free ends being received in the sleeve-like elements provided in the central stand.

In order to insure shock absorption upon impact of a cart, in particular, of a loaded cart on an obstacle, the front connection part has, in a front region of the cross-girder, a forward-projecting shock absorbing portion, preferably provided with a groove for receiving a strip or the like formed of a shock-absorbing elastic material.

In still further preferred embodiment of a push luggage cart according to the present invention, the rear connection parts have each a L-shaped profile the vertical leg of which is provided with a peg-shaped connection member which is form lockingly engaged in the rear end of a respective bar forming the frame, and the horizontal leg of which is provided with two spaced, upward projecting, peg-shaped members for engaging with respective ends of the rear stirrup and the upright handle supporting bars. The two legs of the L-shaped rear connection part are connected with an accurate element to which the rear roller is connected. At that, the peg-shaped member cooperating with one of the upright bars has a central opening for a brake actuation member.

The rear connection part, together with the suspension of a rear roller, is formed as a pre-assembled part and further includes a pair of opposite auxiliary rollers, which rotate about stationary axles spaced a small distance from the rear support roller axle, a sheet metal cover for the rear support roller, and a brake element acting on the tire of the rear support roller and connectable, by a brake member, with the handle.

To insure negotiation of barriers or steps usually existing at the exit from an escalator, special devices are provided on the rear support parts. These devices release the brakes of the rear support rollers or disengage the braked rear support rollers from the surface which forms the movable steps of the escalator, so that the cart can negotiate the barrier or step. Therefore, no manual release of brakes of the rear support rollers is needed when the cart runs off the escalator. Such a device may include auxiliary rollers provided on the rear connection parts, with the auxiliary rollers being so arranged that they are located at a different height than the rear support roller and follow different tracks.

The load-supporting bars, which form the luggage-carrying surface are generally formed of round tubes having a relatively small diameter, with the front ends being form-lockingly engaged in the sleeve-like elements provided on the central stand, and with the rear sidewise offset end portions form-lockingly receiving the peg-shaped members provided on the support members which support the stirrup legs against the handle-carrying upright bars.

Each connection part is formed, as it was discussed earlier, preferably as an injection-molded part from a plastic or other light-weight material.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF THE PREFERRED EMBODIMENT

Figure 1:
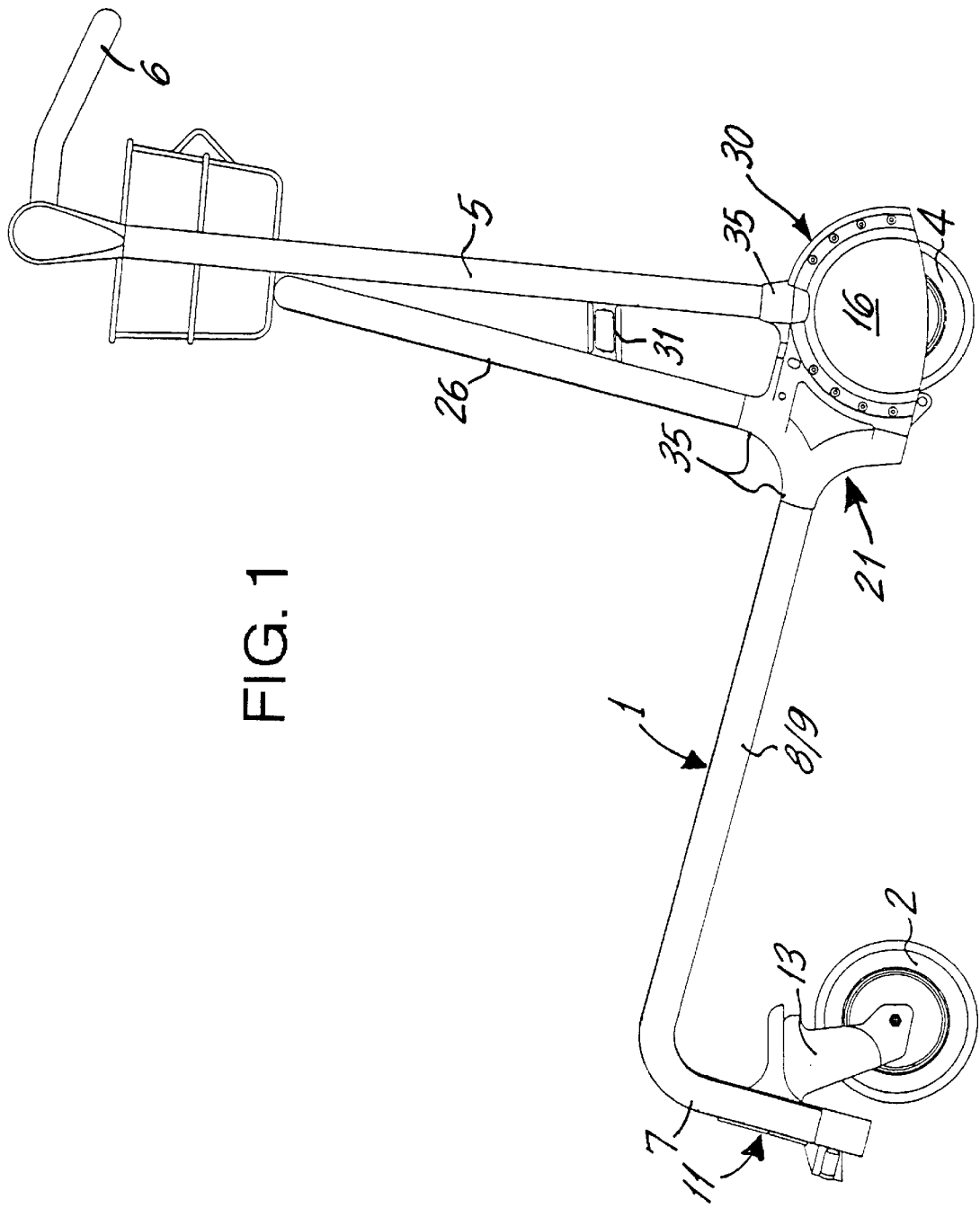
FIG. 1 is a side view of a first embodiment of a push luggage cast according to the present invention.

A push luggage cart, which is shown in the drawings and which forms, together with other identical carts, a row of pushed into each other carts, generally includes, in both embodiments, a rigid load-bearing frame 1, which defines, in the cart longitudinal direction, a luggage-carrying surface, a front, steering roller 2, rotatable about a vertical axis, and two rear support rollers 4, pivotable about a rigid axle 3. The rollers 2 and 4 support the frame 1 on the floor or the ground. In addition, the push luggage cart according to the present invention includes a push handle 6, which is pivotally supported on upright bars 5 and extends substantiality along the entire cart width, and a braking device (not shown), which is detachably attached to the handle 6 and acts on the rear support rollers 4.

Figure 6:
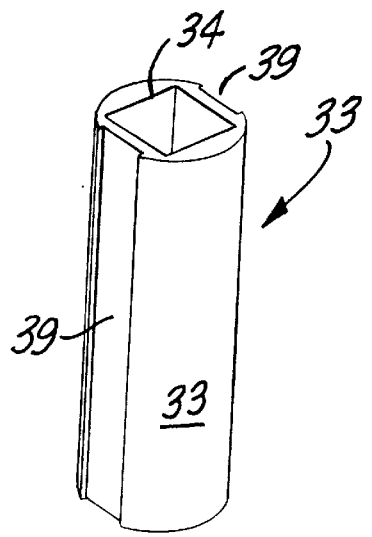
FIG. 6 is a perspective view of a section of a hollow profile used in the construction of push luggage cart according to the present invention.

All of the bars 5, 8, 9 and stirrups 20, 26 of the chassis are formed of a hollow profile which, as shown in FIG. 6, has an outer circumference 33 having a substantially circular cross-section, and a hollow 34 having a square cross-section Peg-shaped connection members 12, 17, 23, 25, 38, which are formed on connection parts 11 and 21, have a square cross-section corresponding to that of the hollow 34. The connection parts 11 and 21 are provided, at least in the region of their end surfaces 32, with bases 35 the cross-section of which corresponds to the cross-section of the outer circumference of the hollow profile from which the bars 5, 8, 9 and stirrups 20, 26 are formed. The outer circumference 33 of the used hollow profile is provide with two opposite longitudinal grooves 39 for receiving strips (not shown) formed of a rubber or plastic material.

Figure 2:
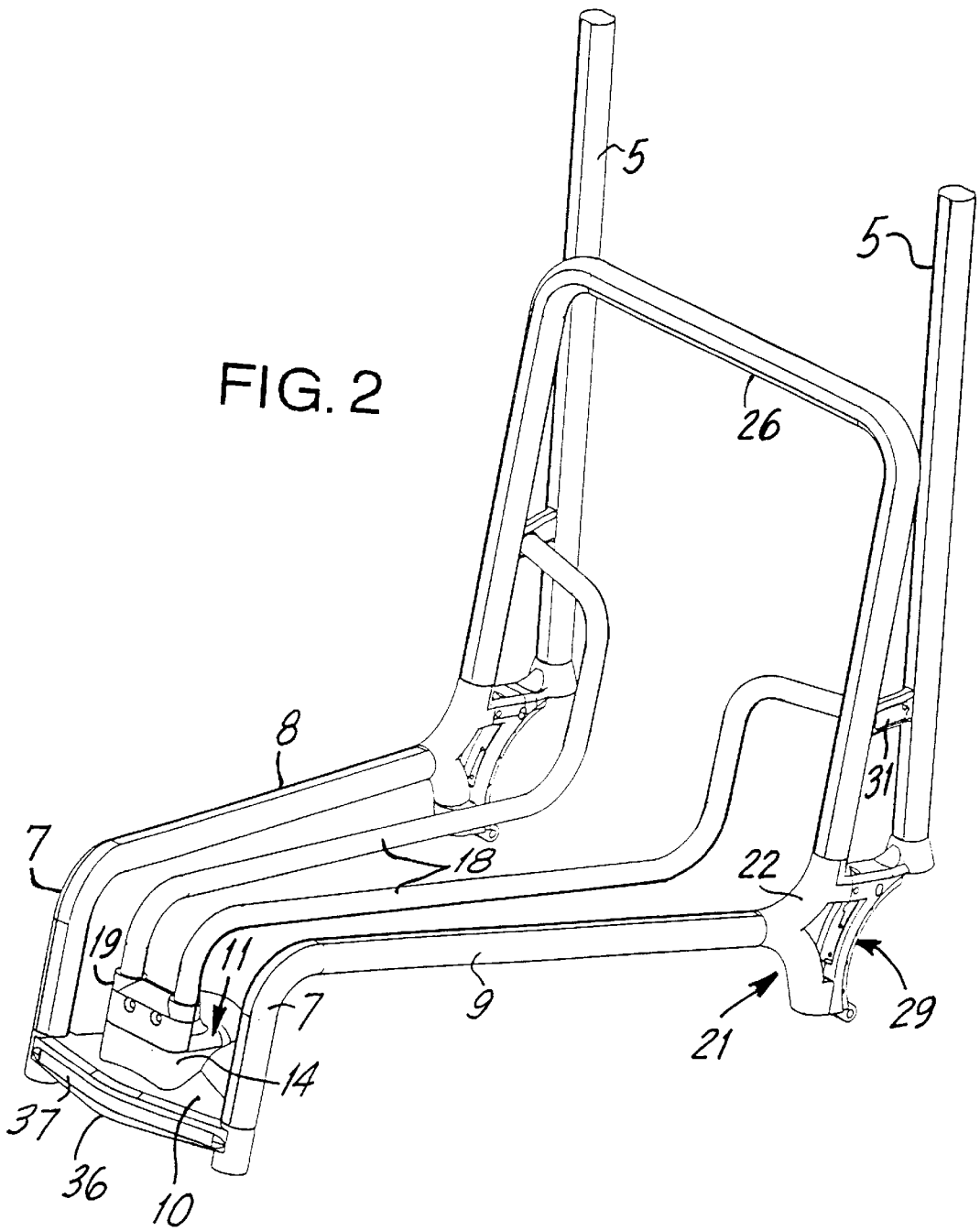
FIG. 2 is a perspective view of the chassis of the luggage cart shown in FIG. 1.
Figure 3:
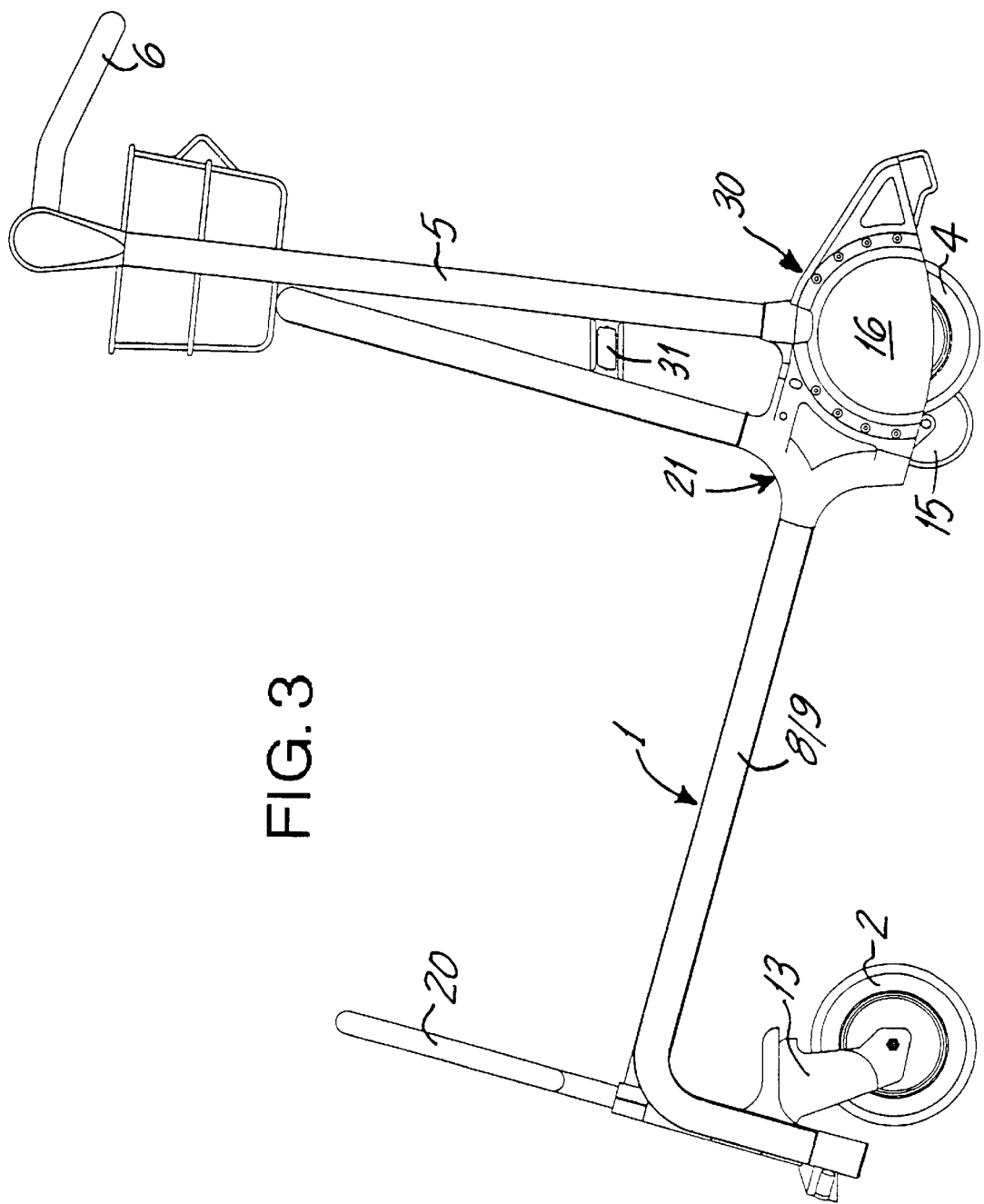
FIG. 3 is a side view of a second embodiment of a push luggage cart according to the present invention.
Figure 4:
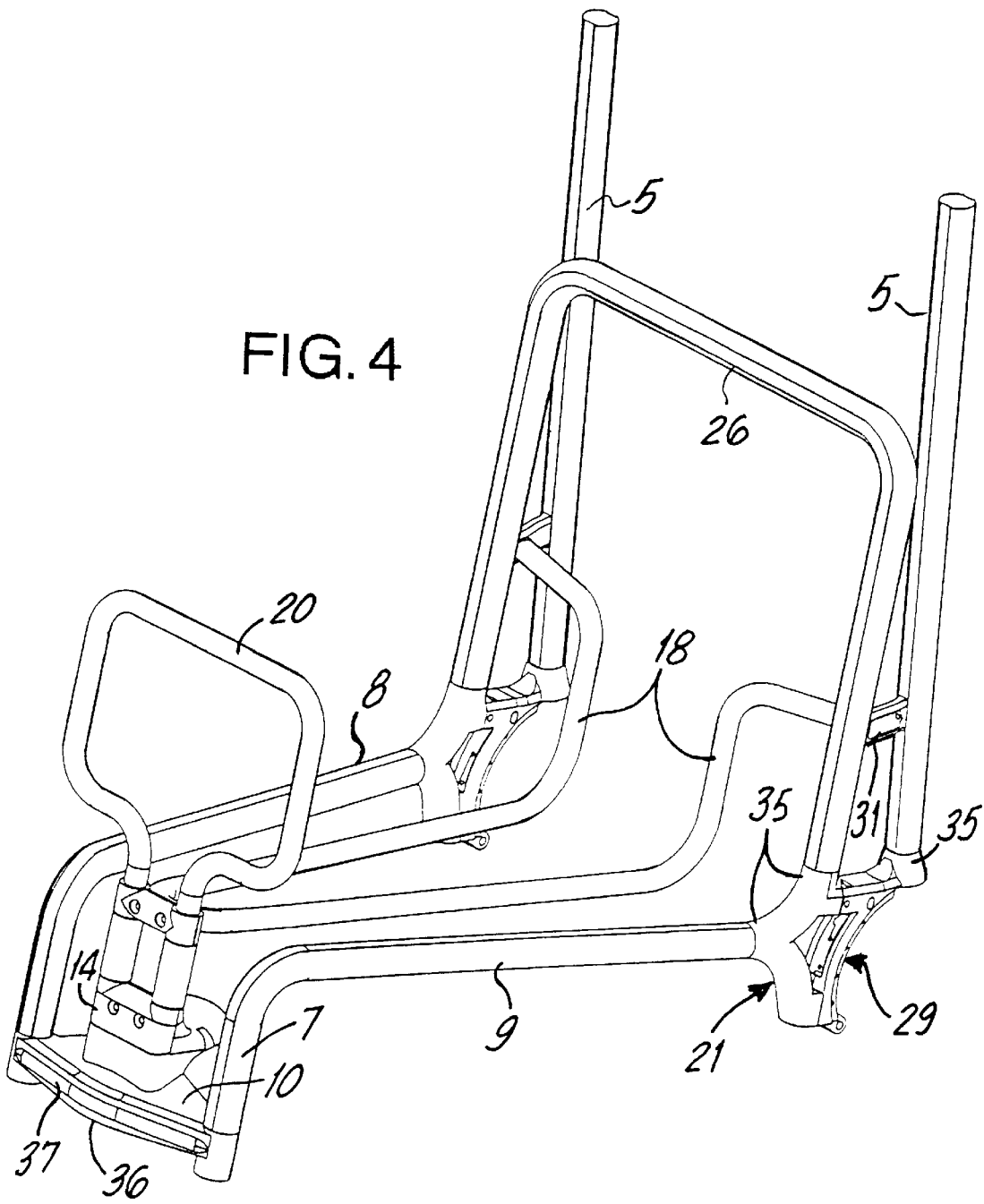
FIG. 4 is a perspective view of the chassis of the luggage cart shown in FIG. 1

The load-bearing frame 1 includes, in all of the embodiments, two substantially L-shaped elongate bars 8 and 9 the downwardly bent legs 7 of which form-lockingly engage the peg-shaped connection members 12 provided at free ends of a cross-girder 10 of the connection part 11 which connects the load-bearing frame 1 with the suspension 13 of the steering roller 2. In the engaged position, the elongate bars 8 and 9 are secured to the connection members 12 with screws (not shown). The connection part 11, which connects the elongate bars 8 and 9 of the load-bearing frame 1 with the suspension 13 of the steering roller 2, has a substantially T-shaped end side, with a stand 14 projecting from the middle of the substantially horizontal cross-girder 10. In all of the embodiments of the inventive push luggage cart, there are provided, within the load-carrying surface limited by the load-bearing frame 1, load-supporting bars 18, which extend substantially in a longitudinal direction of the cart and are formed of tube sections having a circular cross-section. The load-supporting bars 18 have front downwardly bent legs which engage in sleeve-like connection members 19 provided in the stand 14, as shown in the embodiments of FIGS. 1 and 2. In the embodiment of FIGS. 3 and 4, instead of the support bars 18, a stirrup 20, which limits the load-carrying surface, is engaged in the sleeve-like connection members 19, with the support bars 18 being attached to the stirrup 20.

Substantially L-shaped connection parts 21 connect the elongate bars 8 and 9 with the support rollers 4 and the upright bars 5 which support the push handle 6. The substantially vertical leg 22 of each connection parts 21 carries a peg-shaped connection member 23 which is engaged in a respective one of the bars 8 and 9. The substantially horizontal legs 24 of the L-shaped connection parts carry spaced from each other, upwardly extending peg-shaped first and second connection members 25 and 27 for supporting, respectively, luggage-supporting stirrup 26 and the handle-supporting upright bars 5. The legs 22 and and 24 of the connection parts 21 are connected by arcuate members 29 which are connected, respectively, with respective suspensions 30 of the support rollers 24. The peg-shaped connection members 27 are provided, respectively, with through-openings 28 through which brake-actuating elements extend.

The suspension 30 of the support roller 4 is generally formed as a pre-assembled unit including, in addition to the roller support axle 3 for the support roller 4, an auxiliary roller 15 spaced from the roller 4 and rotatably supported on a stationary axle, a metal sheet cover 16 for the support roller 4, and a brake element (not shown) acting on the tire of the support roller 4.

Figure 5:
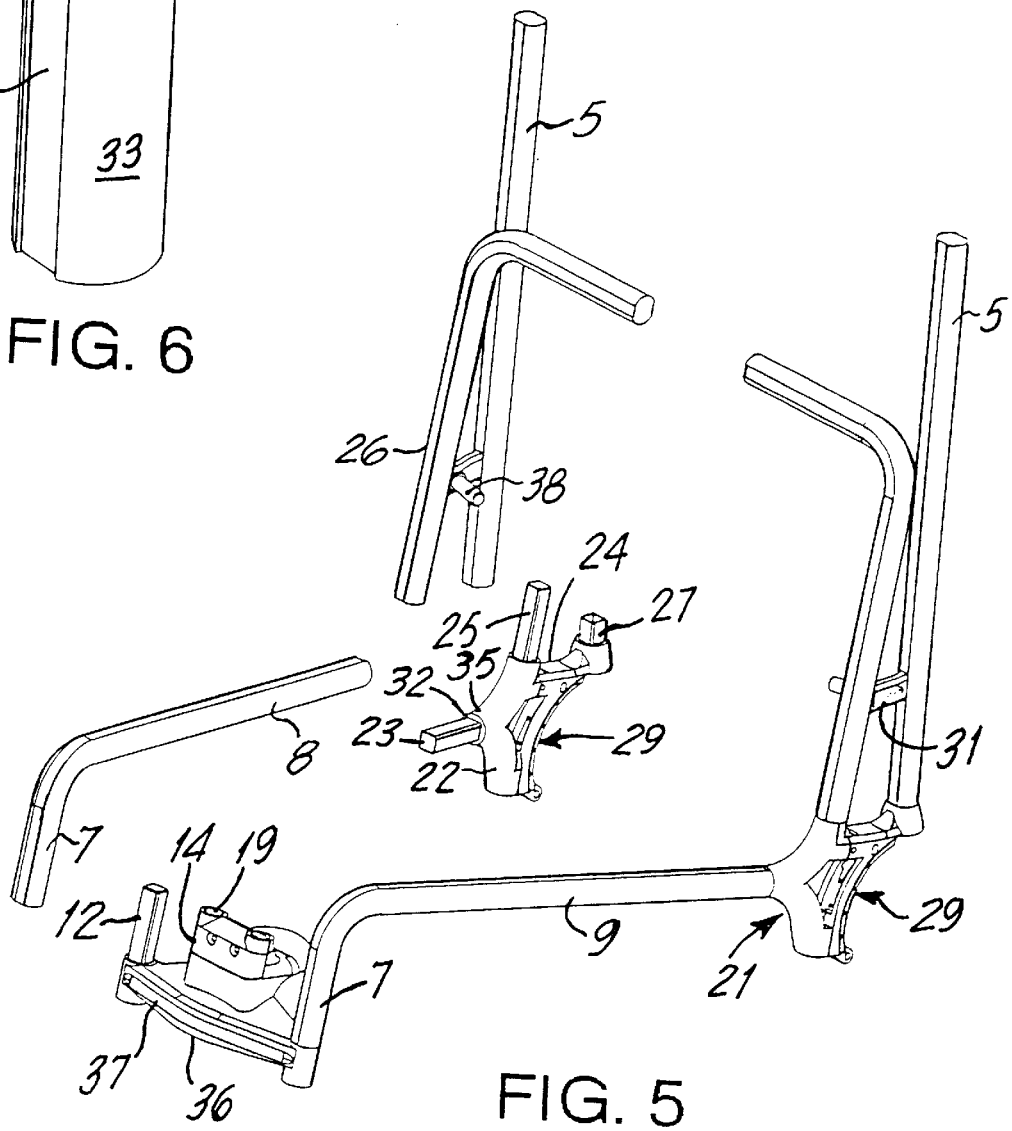
FIG. 5 is an exploded view of a modified chassis of a push luggage cart according to FIG. 1 or 3.

The rear luggage-supporting stirrup 26 is formed of a one-piece hollow profile section and has a substantially U-shaped form. The luggage-supporting stirrups 26 is spaced from the upright bars 5, which are provided with longitudinal grooves 37, and is supported by support members 31 engaging in the grooves of respective upright bars 5. The support members 31 are provided with transverse connection members 38 which engage in respective upper legs of the load-supporting bars 18. As shown in FIG. 5, the luggage-supporting stirrup can be formed of two L-shaped members.

In order to insure shock absorption upon impact of a loaded cart on an obstacle, the load-bearing frame 1 is provided with a bumper 36, which is arranged in front of a cross-girder 10 of the connection part 11 which connects the frame 1 with the steering roller 2. The bumper 36 is formed by a forward-projecting portion of the cross-girder 10 having a groove 37 for receiving a strip or the like (not shown) made of a shock-absorbing elastic material.

Both the connection part 11 and the connection part 21 are form by a one-piece, in particular injection-molded, element.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A push luggage cart, comprising:

a rigid load-bearing frame defining a longitudinal luggage-carrying surface inclined in a direction opposite to a forward movement direction of the cart;

a front steering roller pivotable about a vertical axis and two rear support rollers rotatable about rigid axles for supporting the frame on the ground;

two upright bars for supporting a push handle extending substantially along an entire width of the cart; and means for supporting the frame on the front steering roller and the rear support rollers, the supporting means comprising a front connection part and two rear connection parts all having connection members, wherein the frame includes hollow profile connection sections form-lockingly engaging the connection members of the front and rear connection parts, wherein the push luggage cart further comprises a rear luggage supporting stirrup having a downwardly opening U-shaped form, and wherein the cart further comprises two support elements for supporting respective stirrup bars against respective upright bars, each support element having a support member form-lockingly engaging in longitudinal grooves of a hollow profile section forming a stirrup leg and a hollow profile section forming a respective upright bar.

2. A push luggage cart as set forth in claim 1, wherein the frame comprises two L-shaped hollow profile sections, with front and rear ends of each L-shaped section defining connection sections which form-lockingly engage respective connection members of the front connection part and respective rear connection parts, wherein the L-shaped hollow profile sections of the frame, the upright bars, the push handle, and the luggage supporting stirrup are all formed of a same hollow profile having a substantially circular outer circumference and a square cross-section of a profile hollow, wherein the connection members of the connection parts have a square cross-section complementary to the square cross-section of the profile hollow, and wherein the connection parts have, at least in regions of end surfaces thereof, base elements having openings with a cross-section corresponding to the cross-section of the outer circumference of the hollow profile.

3. A push luggage cart as set forth in claim 1, wherein the luggage -carrying surface comprises two load supporting bars having each a rear sidewise portion extending substantially perpendicular to a respective stirrup bar, and wherein the support member has a transverse connection member form-lockingly engageable with the rear sidewise portion of a respective load-supporting bar.

4. A push luggage cart as set forth in claim 3, wherein the load supporting bars are formed of a hollow profile and have each front downwardly extending end portion, and wherein the front connection part comprises a T-shaped cross-girder having a central stand with two spaced sleeve-shaped members in which the downwardly extending end portions of the stirrup bars respectively engage.

5. A push luggage cart as set forth in claim 1, wherein the front and rear connection parts are formed as one-piece injection-molded parts.

* * * * *